March 31, 1925.

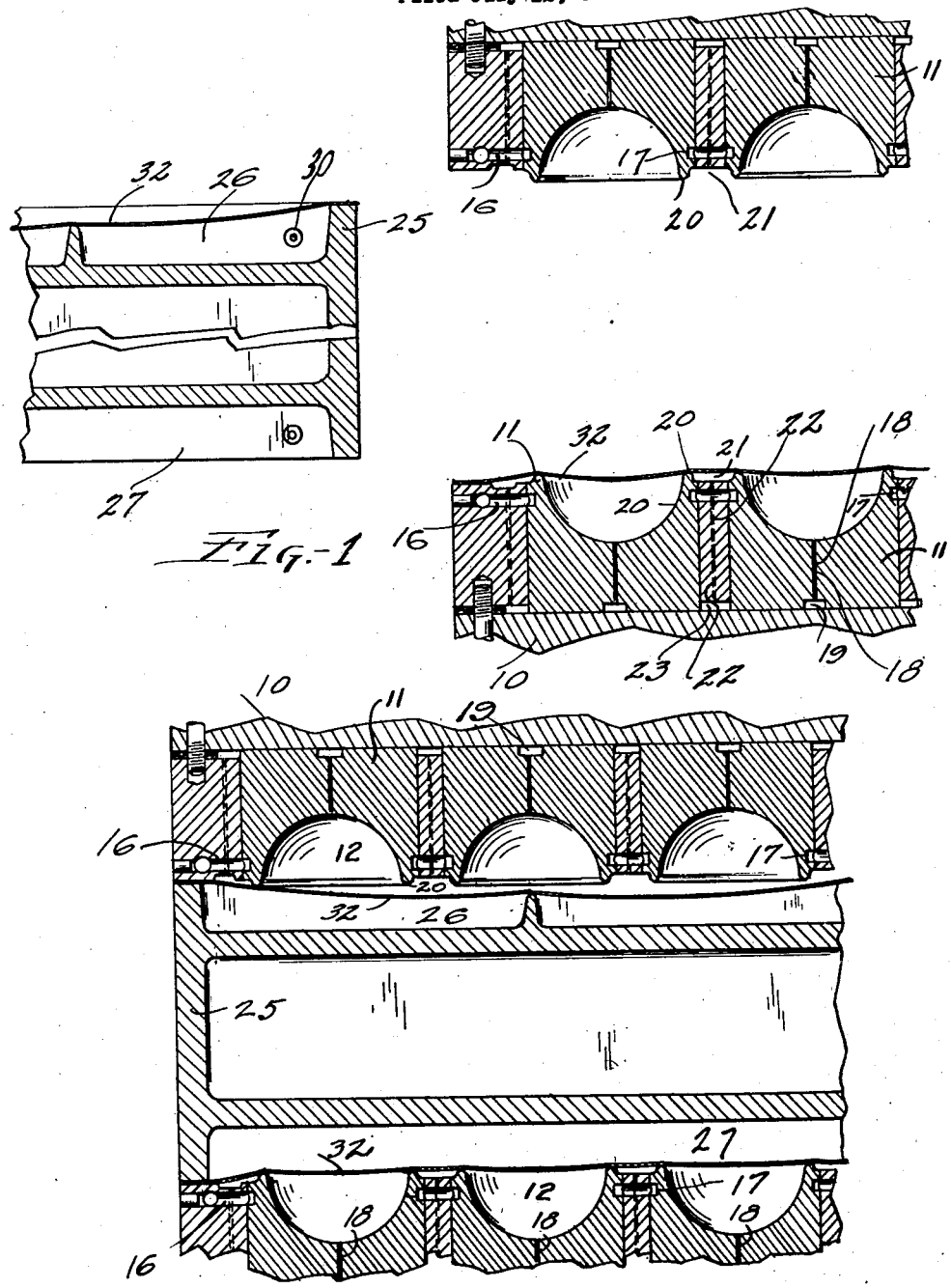
March 31. 1925.
F. T. ROBERTS
PROCESS OF MAKING ARTICLES OF CELLULOID AND SIMILAR MATERIAL
Filed July 12, 1921  4 Sheets-Sheet 1
1,531,505

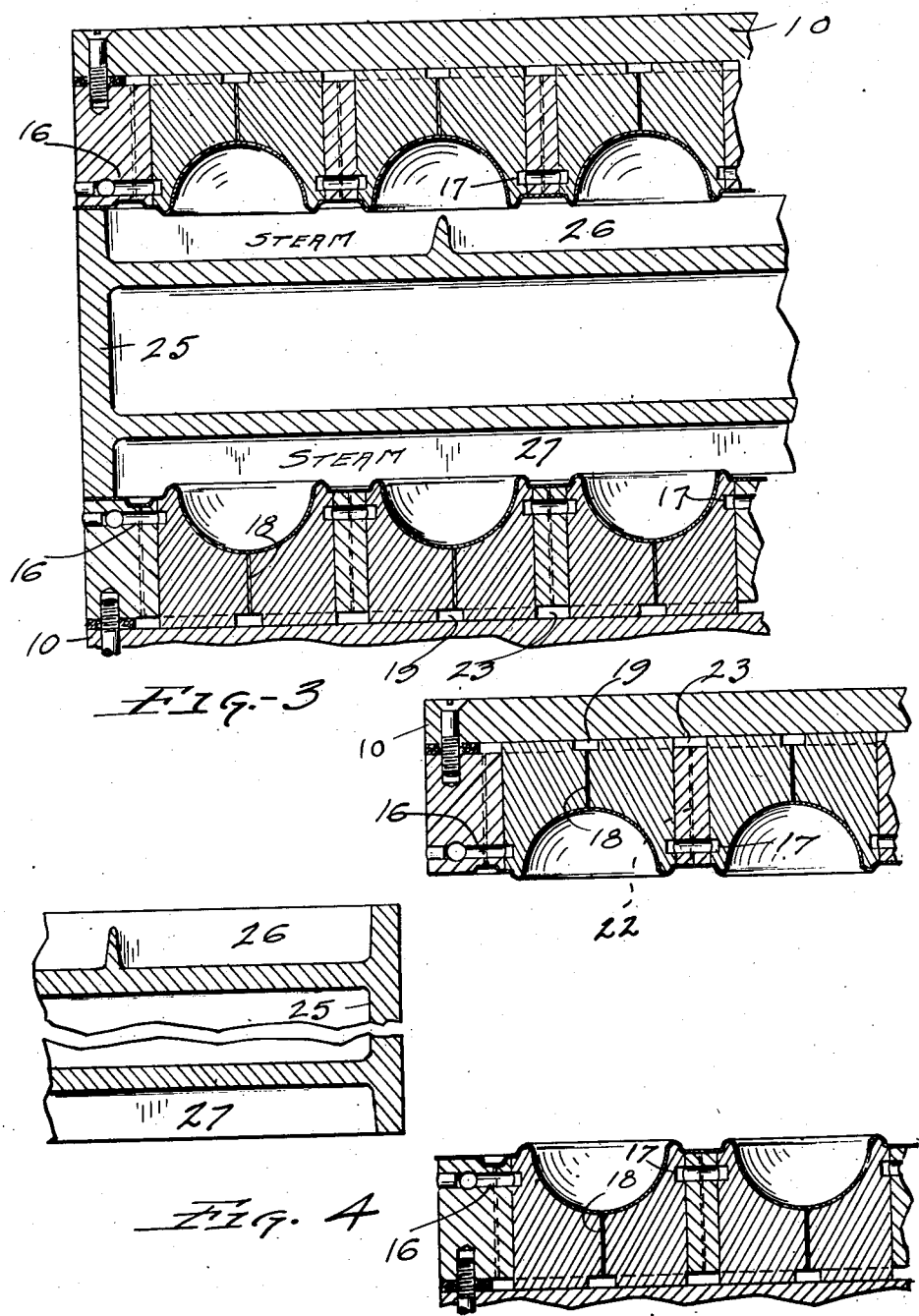

F. T. ROBERTS 1,531,505

PROCESS OF MAKING ARTICLES OF CELLULOID AND SIMILAR MATERIAL

Filed July 12, 1921  4 Sheets-Sheet 3

INVENTOR
Fred Thomas Roberts,
BY Baker & Macklin,
ATTORNEYS

March 31, 1925. 1,531,505

F. T. ROBERTS

PROCESS OF MAKING ARTICLES OF CELLULOID AND SIMILAR MATERIAL

Filed July 12, 1921    4 Sheets-Sheet 4

Patented Mar. 31, 1925.

1,531,505

UNITED STATES PATENT OFFICE.

FRED THOMAS ROBERTS, OF PHILADELPHIA, PENNSYLVANIA, ASSIGNOR TO PARAMOUNT RUBBER CONSOLIDATED, INC., OF TUCKAHOE, NEW YORK, A CORPORATION OF DELAWARE.

PROCESS OF MAKING ARTICLES OF CELLULOID AND SIMILAR MATERIAL.

Application filed July 12, 1921. Serial No. 484,250.

*To all whom it may concern:*

Be it known that I, FRED THOMAS ROBERTS, a citizen of the United States, residing at Philadelphia, in the county of Philadelphia and State of Pennsylvania, have invented a certain new and useful Improvement in Processes of Making Articles of Celluloid and Similar Material, of which the following is a full, clear, and exact description, reference being had to the accompanying drawings.

The object of this invention is to provide for the rapid and accurate formation of hollow articles made from sheets of celluloid or similar material.

A characteristic of the invention is that the material from which the article is made is rendered plastic, and while in that condition is seated by fluid pressure in mold cavities, thus doing away with the use of male and female molds and the consequent requirement for accurate adjustment between the two to provide proper wall thickness.

Another characteristic of the invention is that the stock is first rendered plastic and then seated in complementary mold cavities, after which the molds are brought together and the contiguous faces of the formed parts are united to form the complete article.

According to the preferred manner of carrying out my invention, steam may be used as the means to render the sheet soft and also may serve as the means for supplying the fluid pressure to seat the sheet in the mold cavities.

A feature of the invention is the provision whereby a celluloid sheet is heated and forced into a mold cavity and the major portion of the formed article is cooled while the periphery remains plastic and whereby after cooling, the perimeter of the two previously formed complementary parts are united to form the finished article.

Figure 5:
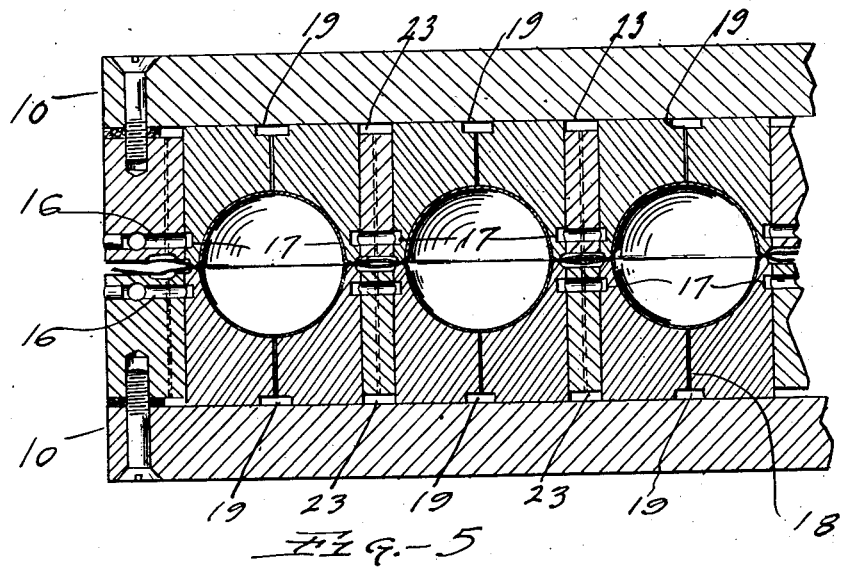
Figure 6:
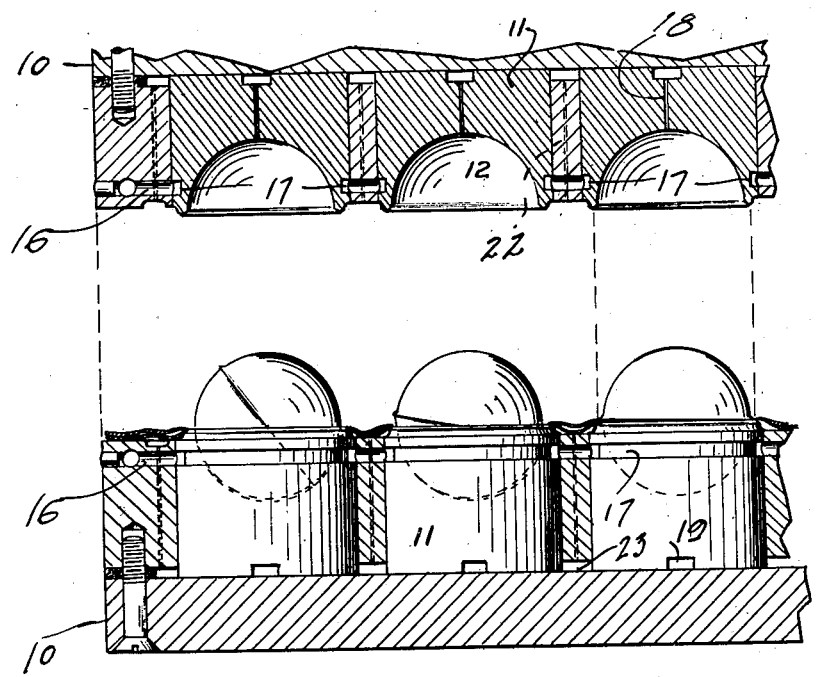
Figure 7:
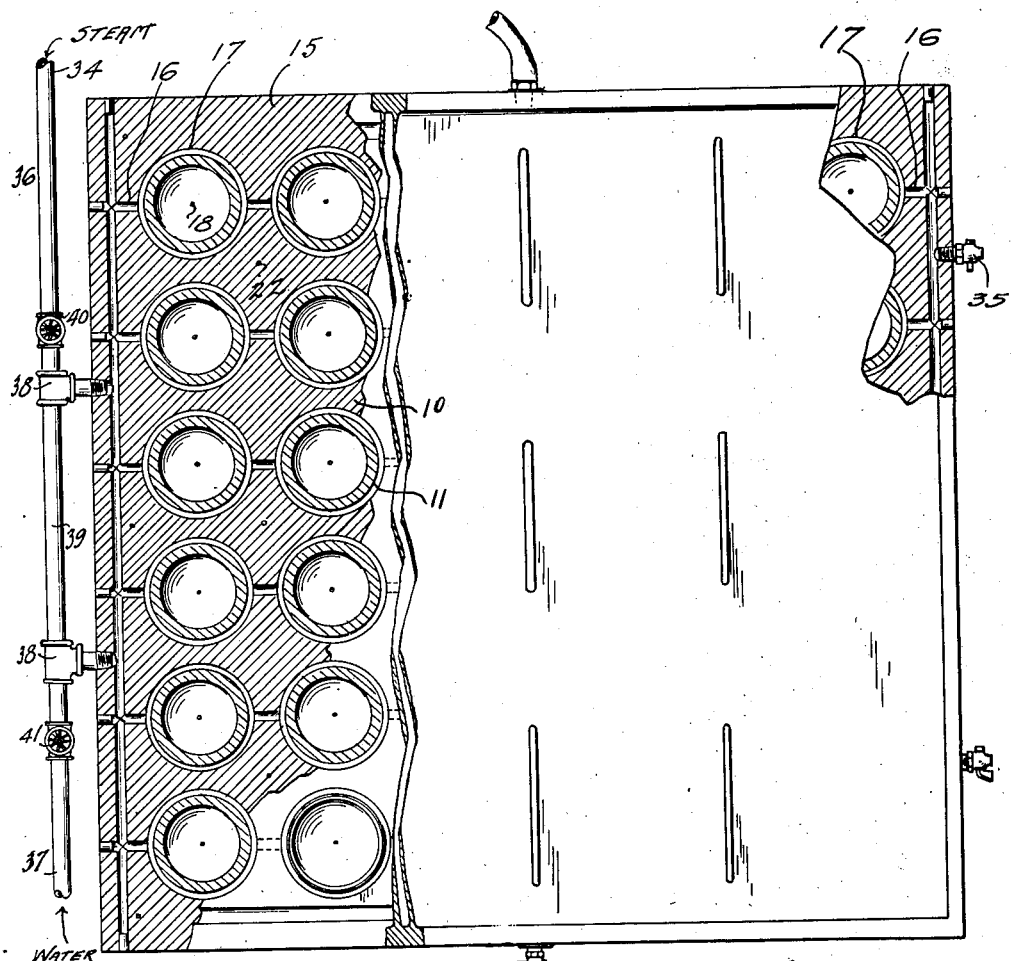
Figure 8:
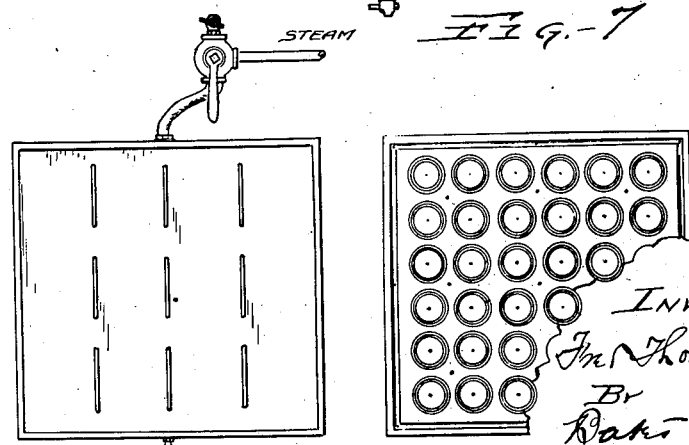

Further additional objects of the invention will be apparent from the following description taken in connection with the accompanying drawings, wherein in Fig. 1 is a sectional view showing a portion of a mold apparatus used in carrying out my process, the mold members being shown separated and the steam chest removed from between them. Fig. 2 is a sectional view showing the mold members after the same have been brought together with the steam chest in position. Fig. 3 is a section similar to Fig. 2 showing a plastic sheet forced to its seat by the steam pressure. Fig. 4 is a sectional view, similar to Fig. 3 with the steam chest removed. Fig. 5 is a sectional view showing the mold members brought together to form the completed article. Fig. 6 is a sectional view partly in elevation showing the mold members after separation and the completed articles. Fig. 7 is a horizontal plan partly in section showing the steam chest and a lower cavitary mold member. Fig. 8 is a plan showing an arrangement of the steam chest and a cavitary mold member.

Referring to the drawings by reference characters, I have shown at 10 a base or mold plate provided with a plurality of individual mold members 11 each having a cavity 12. The mold members are shown as fitted in an apertured block 15, the block being provided adjacent the mold members with conduits 16 which communicate with circumferential channels 17 arranged about the upper portion of each mold cavity. A bore 18 may be provided adjacent the lower portion of each mold cavity and these bores 18 communicate through a channel 19 to the atmosphere.

The upper edge of each mold cavity is provided with a cutting edge 20 and with a depression 21 adjacent the cutting edges. The cavities 21 may be vented by suitable channels 22, which communicate through the passage 23 with the atmosphere. It will be noted from the drawings that the mold members are arranged one above the other with the cavities opposed.

The lower mold member may rest upon a head of a suitable hydraulic press, while the upper member may be secured to the top of the press in any desired manner. Any suitable type of press may be used, for instance, the one shown in my prior Patent No. 1,201,503, patented October 16, 1916.

Co-operating with the mold members, I have shown a suitable steam chest 25. This steam chest comprises upper and lower mold cavities, 26 and 27, each of which can be placed in communication by means of a three-way valve with a suitable source of stream. A suitable pet cock 30 may serve as a bleeder for the cavities 26 and 27. The steam chest is arranged so that it may be readily moved to position between the mold members when desired.

My process may be carried out in the following manner. A sheet of celluloid or similar material 32 is placed upon the lower series of mold cavities with the edges thereof extending approximately to the edge of said mold cavities. A second sheet of celluloid is placed upon the top portion of the steam chest 25; this being done the steam chest is moved opposite the mold members and when the hydraulic press is operated, the sheets are tightly clamped between the chest of the steam chest and the edges of the mold members.

The pressure on the edges of the celluloid sheets forms a tight joint so that when steam is admitted to the steam chest, there will be no leaks between the molds and the chest. When steam is admitted to the chamber, the celluloid sheets are softened by the heat and at the same time the pressure of the steam causes the sheets to seat in the individual mold cavities. The air in the mold cavities passes through apertures 18 and the channel 19 to the atmosphere, while the air in the depressions 21 passes through apertures 22 to the atmosphere.

When all the individual articles have been seated in the mold cavities, the steam is turned off from the steam chest and the latter removed. The shaped celluloid sheet is then cooled by any desired means such as a blast of cooled air blown directly upon the faces of the sheets or by any other desired means.

In order that the periphery of the formed members may be maintained plastic for a purpose to be presently described, steam is admitted to the conduits 16 from the steam line 34 and the steam pressure is maintained in these conduits 16 and in the circumferential channel 17 while the sheet is being formed and while it is being cooled. A suitable bleeder valve 35 may be provided for the channels 16. The result of this treatment is that when the steam chest is removed and the blast of air or other cooling means has served to render the major portion of the formed article dense, the peripheries thereof remain somewhat plastic.

The next step in carrying out my process is as follows: The periphery of each of the formed articles adjacent the cutting edge 20, is moistened with collodion or other solvent, and the edges are brought together with the result that the cutting edges 20 surrounding the mold cavities act to sever the individual articles from the sheet. At the same time, the edges of the complementary parts are brought together and compacted and united to form complete closed articles. As soon as this is done, steam is turned off from the conduit 16. After the articles have been sufficiently cooled, the mold members are separated and the complete articles removed.

If desired, suitable means may be provided to cool the periphery of the mold members. This may be done, for instance, by providing suitable connections between the steam lines 34 and a water line 37. The connections here shown comprise two T's 38, both of which communicate with the channel 16 and are themselves connected by the pipe 39. Suitable valves 40 and 41 serve to control the flow of steam or water as desired. When steam is desired in the channel 16, the valve 41 is closed and the valve 40 opened and when it is desired to cool the molds, the valve 40 is closed and the valve 41 opened.

It should be noted that the vents from the cavities and from the spaces between them and from the annular surrounding channels are of very small bore (being exaggerated in the drawings for clearness of illustration) so that the atmospheric air may only pass back from the inner surface of the stock very gradually. This characteristic, together with the adherence of the celluloid to the metal which results in the post contact provided by this method allows ample time for the removal of the steam chest and hot plate and the turning of the article before material separation takes place between the seated stock and the material surface.

The process described may be used in manufacturing a great many different articles. I have shown it in the drawing as adapted to make a child's hollow celluloid ball, but this is to be only taken as illustrative of one of the many uses of my process.

Having thus described my invention, what I claim is:

1. A process of making hollow celluloid articles, which consists in first rendering sheets of celluloid plastic, then forcing said celluloid sheets into complemental mold cavities, cooling the major portion of the complemental parts and uniting the complemental parts.

2. A process of making hollow celluloid articles, which consists in first rendering a sheet of celluloid plastic by heat, then forcing said celluloid sheets into mold cavities, coooling portions of the sheet while leaving other portions comparatively hot in regions where they are to be joined, and uniting the sheets in such regions.

3. The process of making hollow celluloid articles which consists in simultaneously heating and pneumatically seating a sheet of celluloid into a mold cavity to form a part of an article, cooling the major portion of said formed part, while maintaining the periphery thereof plastic, seating a second portion on the plastic periphery and uniting it thereto.

4. The process of making hollow celluloid articles which consists in first heating sheets of celluloid, forcing the hot celluloid sheets by fluid pressure into complementary opposed mold cavities, bringing said opposed mold cavities together and uniting the edges of the articles and simultaneously severing the surplus stock from the finished article.

5. The process of making hollow celluloid articles which consists of heating and seating a sheet of celluloid into a mold cavity by steam pressure, to form a part of an article, cooling a portion of said formed part, while maintaining another portion thereof plastic, and uniting a second portion thereto.

6. The process of making hollow celluloid articles which consists in first heating a sheet of celluloid by steam to make it plastic, forcing said plastic sheet into a mold cavity to form a part of an article, cooling the major portion of the formed part, while maintaining the periphery thereof plastic, placing the second portion of said article upon the plastic periphery, uniting said parts at the periphery and cutting off the surplus material.

7. The process of making hollow celluloid articles which consists in first rendering a sheet of celluloid plastic by heat, then forcing the plastic sheet into a mold cavity to form part of an article, applying solvent to a portion of the seated stock, bringing another part of the article into engagement with the first mentioned portion and uniting the two parts together.

8. The process of making hollow celluloid articles which consists in first heating sheets of celluloid, forcing said celluloid sheets by fluid pressure into complementary opposed mold cavities. applying solvent to the edges of the seated material, bringing said opposed mold cavities together and uniting the edges of the articles and simultaneously severing the surplus stock from the finished article.

9. The process of making hollow celluloid articles which consists in first heating a sheet of celluloid by steam to make it plastic, forcing said plastic sheet into a mold cavity to form a part of an article, cooling the major portion of the formed part, while maintaining the periphery thereof plastic, applying solvent to said periphery, causing said plastic periphery to unite with the periphery of another part, cutting off the surplus material, and finally cooling the seamed part.

In testimony whereof, I hereunto affix my signature.

FRED THOMAS ROBERTS.